(12) United States Patent
Hiramoto et al.

(10) Patent No.: US 9,041,770 B2
(45) Date of Patent: *May 26, 2015

(54) THREE-DIMENSIONAL IMAGE CAPTURE DEVICE

(75) Inventors: Masao Hiramoto, Osaka (JP);
Masayuki Misaki, Hyogo (JP);
Teruyuki Takizawa, Osaka (JP);
Masaaki Suzuki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 332 days.

This patent is subject to a terminal disclaimer.

(21) Appl. No.: 13/255,386

(22) PCT Filed: Dec. 22, 2010

(86) PCT No.: PCT/JP2010/007435
§ 371 (c)(1),
(2), (4) Date: Sep. 8, 2011

(87) PCT Pub. No.: WO2011/083542
PCT Pub. Date: Jul. 14, 2011

(65) Prior Publication Data
US 2011/0316983 A1    Dec. 29, 2011

(30) Foreign Application Priority Data

Jan. 5, 2010 (JP) .................................. 2010-000377
Jan. 14, 2010 (JP) .................................. 2010-005467

(51) Int. Cl.
*G06K 9/00* (2006.01)
*G02F 1/1335* (2006.01)
(Continued)

(52) U.S. Cl.
CPC ............... *H04N 13/021* (2013.01); *G06K 9/00* (2013.01); *G03B 35/08* (2013.01); *G03B 35/10* (2013.01); *H04N 13/0214* (2013.01)

(58) Field of Classification Search
CPC ....... G02B 27/28; H04N 13/02; H04N 5/335; G02F 1/335

USPC ............... 348/42, 43, 44, 45, 46, 49, 280; 359/371, 376, 462, 487; 386/210, 223, 386/224; 352/57; 396/324; 324/309; 382/154
See application file for complete search history.

(56) References Cited

U.S. PATENT DOCUMENTS 4,239,338 A    12/1980   Borrelli et al.
4,709,212 A *  11/1987   MacFall et al. ............... 324/309
(Continued)

FOREIGN PATENT DOCUMENTS

| CN | 1571519 A | 1/2005 |
|---|---|---|
| CN | 1798958 A | 7/2006 |
| JP | 62-217790 A | 9/1987 |
| JP | 62-291292 A | 12/1987 |
| JP | 2001-016611 A | 1/2001 |
| JP | 2002-148732 A | 5/2002 |

OTHER PUBLICATIONS

Atarius, Roozbeh, Signal-to-Noise ratio Enhancement of Cardiac Late Potentials using Ensemble Correlation, Feb. 20, 1995, IEEE Trans., p. 2.

(Continued)

*Primary Examiner* — Jorge L Ortiz Criado
*Assistant Examiner* — Albert Kir
(74) *Attorney, Agent, or Firm* — Renner, Otto, Boisselle & Sklar, LLP

(57) ABSTRACT

The present invention provides an image capturing technique for obtaining, at the same time, multiple images with parallax and an image that would cause no sensitivity problem even without mechanically operating any part of its image capturing system.

The 3D image capture device of this invention includes: a light transmitting member 2 having a polarizing area A that transmits only a light ray polarized in a particular direction and a non-polarizing area C that transmits any light ray irrespective of its polarization direction; a solid-state image sensor 1 arranged to receive the light ray transmitted through the light transmitting member 2; an imaging section 3 for producing an image on the imaging area 1a of the solid-state image sensor 1; and an image generating section for generating images based on signals supplied from the image sensor 1, which includes a filter array including a polarization filter. The image generating section generates images based on the light rays that have entered the polarizing area A and the non-polarizing area C, respectively.

16 Claims, 6 Drawing Sheets

(51) Int. Cl.
   *H04N 5/335*   (2011.01)
   *H04N 13/02*   (2006.01)
   *G03B 35/08*   (2006.01)
   *G03B 35/10*   (2006.01)

(56) References Cited

U.S. PATENT DOCUMENTS

| | | | | |
|---|---|---|---|---|
| 5,557,324 | A * | 9/1996 | Wolff | 345/207 |
| 5,649,897 | A * | 7/1997 | Nakamura et al. | 600/111 |
| 6,807,295 | B1 * | 10/2004 | Ono | 382/154 |
| 8,120,861 | B2 * | 2/2012 | Moskovits et al. | 359/819 |
| 2004/0201888 | A1 | 10/2004 | Hagita | |
| 2006/0082879 | A1 | 4/2006 | Miyoshi et al. | |
| 2010/0253820 | A1 * | 10/2010 | Kanamori et al. | 348/280 |
| 2010/0289878 | A1 * | 11/2010 | Sato et al. | 348/46 |
| 2010/0321476 | A1 * | 12/2010 | Martinez et al. | 348/49 |
| 2012/0075432 | A1 * | 3/2012 | Bilbrey et al. | 348/48 |
| 2014/0055661 | A1 | 2/2014 | Imamura et al. | |

OTHER PUBLICATIONS

Usmani, Riaz, Applied Linear Algebra, 1987, Marcel Dekker Inc, Ed. 1, p. 9.

Chinese Search Report with English translation for corresponding Chinese patent application No. 201080009869.2 dated Mar. 5, 2014.

Chinese Search Report for corresponding Chinese App. No. 201080009911.0 dated Mar. 24, 2014, with English translation.

International Search Report for corresponding International Application No. PCT/JP2010/007435 mailed Feb. 8, 2011.

International Search Report for related International Application No. PCT/JP2010/007436 mailed Feb. 8, 2011.

Co-pending U.S. Appl. No. 13/255,393, filed Sep. 8, 2011 in the name of M. Hiramoto et al. and entitled "Three-Dimensional Image Capture Device".

Final Office Action for related U.S. Appl. No. 13/255,393, dated Oct. 23, 2014.

* cited by examiner

THREE-DIMENSIONAL IMAGE CAPTURE DEVICE

TECHNICAL FIELD

The present invention relates to a single-lens 3D image capturing technology for capturing multiple images with parallax by using one optical system and one image sensor.

BACKGROUND ART

Recently, the performance and functionality of digital cameras and digital movie cameras that use some solid-state image sensor such as a CCD and a CMOS (which will be sometimes simply referred to herein as an "image sensor") have been enhanced to an astonishing degree. In particular, the size of a pixel structure for use in an image sensor has been further reduced these days thanks to rapid development of semiconductor device processing technologies, thus getting an even greater number of pixels and drivers integrated together in an image sensor. As a result, the resolution of an image sensor has lately increased rapidly from one million pixels to ten million or more pixels in a matter of few years. On top of that, the quality of an image captured has also been improved significantly as well. As for display devices, on the other hand, LCD and plasma displays with a reduced depth now provide high-resolution and high-contrast images, thus realizing high performance without taking up too much space. And such video quality improvement trends are now spreading from 2D images to 3D images. In fact, 3D display devices that achieve high image quality although they require the viewer to wear a pair of polarization glasses have been developed just recently and put on the market one after another.

As for the 3D image capturing technology, a typical 3D image capture device with a simple arrangement uses an image capturing system with two cameras to capture a right-eye image and a left-eye image. According to the so-called "two-lens image capturing" technique, however, two cameras need to be used, thus increasing not only the overall size of the image capture device but also the manufacturing cost as well. To overcome such a problem, methods for capturing multiple images with parallax by using a single camera have been researched and developed. For example, Patent Document No. 1 discloses a scheme that uses two polarizers, of which the transmission axes cross each other at right angles, and a rotating polarization filter.

FIG. 10 is a schematic representation illustrating an arrangement for an image capturing system that adopts such a scheme. This image capturing system includes a 0-degree-polarization polarizer 11, a 90-degree-polarization polarizer 12, a reflective mirror 13, a half mirror 14, a circular polarization filter 15, a driver 16 that rotates the circular polarization filter 15, an optical lens 3, and an image capture device 9 for capturing the image that has been produced by the optical lens. In this arrangement, the half mirror 14 reflects the light that has been transmitted through the polarizer 11 and then reflected from the reflective mirror 13 but transmits the light that has been transmitted through the polarizer 12. With such an arrangement, the light rays that have been transmitted through the two polarizers 11 and 12, which are arranged at two different positions, pass through the half mirror 14, the circular polarization filter 15 and the optical lens 3 and then enter the image capture device 9, where an image is captured. The image capturing principle of this scheme is that two images with parallax are captured by rotating the circular polarization filter 15 so that the light rays that have entered the two polarizers 11 and 12 are imaged at mutually different times.

According to such a scheme, however, images at mutually different positions are captured time-sequentially by rotating the circular polarization filter 15, and therefore, those images with parallax cannot be captured at the same time, which is a problem. In addition, the durability of such a system is also a question mark because the system uses mechanical driving. On top of that, since all of the incoming light is received by the polarizers and the polarization filter, the quantity of the light received eventually by the image capture device 9 decreases by as much as 50%, which is non-negligible, either.

To overcome these problems, Patent Document No. 2 discloses a scheme for capturing two images with parallax without using such mechanical driving. An image capture device that adopts such a scheme gets the two incoming light rays, which have come from two different directions, condensed by a reflective mirror, and then received by an image capture device in which two different kinds of polarization filters are arranged alternately, thereby capturing two images with parallax without using a mechanical driving section.

FIG. 11 is a schematic representation illustrating an arrangement for an image capturing system that adopts such a scheme. This image capturing system includes two polarizers 11 and 12, of which the transmission axes are arranged to cross each other at right angles, reflective mirrors 13, an optical lens 3, and an image capture device 1. On its imaging area, the image capture device 1 has a number of pixels 10 and polarization filters 17 and 18, each of which is provided one to one for an associated one of the pixels 10. Those polarization filters 17 and 18 are arranged alternately over all of those pixels. In this case, the transmission axis directions of the polarization filters 17 and 18 agree with those of the polarizers 11 and 12, respectively.

With such an arrangement, the incoming light rays are transmitted through the polarizers 11 and 12, reflected from the reflective mirrors 13, passed through the optical lens 3 and then incident on the imaging area of the image capture device 1. Those light rays to be transmitted through the polarizers 11 and 12, respectively, and then incident on the image capture device 1 are transmitted through the polarization filters 17 and 18 and then photoelectrically converted by the pixels that face those polarization filters 17 and 18. If the images to be produced by those light rays that have been transmitted through the polarizers 11 and 12 and then incident on the image capture device 1 are called a "right-eye image" and a "left-eye image", respectively, then the right-eye image and the left-eye images are generated by a group of pixels that face the polarization filters 17 and a group of pixels that face the polarization filter 18.

As can be seen, according to the scheme disclosed in Patent Document No. 2, two kinds of polarization filters, of which the transmission axes are arranged so as to cross each other at right angles, are arranged alternately over the pixels of the image capture device, instead of using the circular polarization filter disclosed in Patent Document No. 1. As a result, although the resolution decreases to a half compared to the method of Patent Document No. 1, a right-eye image and a left-eye image with parallax can be obtained at the same time by using a single image capture device.

According to such a technique, however, the incoming light has its quantity decreased considerably when being transmitted through the polarizers and the polarization filters, and therefore, the quantity of the light received by the image capture device decreases as significantly as in Patent Document No. 1.

As another approach to the problem that the image capture device comes to receive a decreased quantity of light, Patent Document No. 3 discloses a technique for mechanically changing the modes of operation from the mode of capturing multiple images that have parallax into the mode of capturing a normal image, and vice versa. FIG. 12 schematically illustrates an arrangement for an image capturing system that uses such a technique. The image capture device shown in FIG. 12 includes a light transmitting member 19 that has two polarized light transmitting portions 20 and 21 and that transmits the light that has come from an optical lens 3 only through those transmitting portions, a light receiving member optical filter tray 22 in which particular component transmitting filters 23 that split the light that has come from the polarized light transmitting portions 20 and 21 and color filters 24 are arranged as a set, and a filter driving section 25 that removes the light transmitting member 19 and the particular component transmitting filters 23 from the optical path and inserts the color filters 24 onto the optical path instead, and vice versa.

According to this technique, by running the filter driving section 25, the light transmitting member 19 and the particular component transmitting filters 23 are used to capture two images with parallax, while the color filters 24 are used to capture a normal image. However, the two images with parallax are shot in basically the same way as in Patent Document No. 2, and therefore, the incoming light can be used much less efficiently than in a normal image capturing session. When a normal color image is shot, on the other hand, the light transmitting member 19 is removed from the optical path and the color filters 24 are inserted instead of the particular component transmitting filters 23. As a result, a color image can be generated with the incoming light used highly efficiently.

CITATION LIST

Patent Literature

Patent Document No. 1: Japanese Patent Application Laid-Open Publication No. 62-291292
Patent Document No. 2: Japanese Patent Application Laid-Open Publication No. 62-217790
Patent Document No. 3: Japanese Patent Application Laid-Open Publication No. 2001-016611

SUMMARY OF INVENTION

Technical Problem

According to these conventional techniques, a single-lens camera can capture two images with parallax by using polarizers (or a polarized light transmitting member) and polarization filters. In this case, each of those polarizers and polarization filters is made up of two different kinds of polarization elements, of which the transmission axes are defined by 0 and 90 degrees, respectively. That is why although two images with parallax can be certainly captured with a single lens camera, the incoming light cannot be used so efficiently and the image capturing sensitivity is lower than usual. On top of that, to obtain a color image without causing the sensitivity problem, the light receiving member should be provided with an optical filter tray or a filter driving section. Furthermore, even if the optical filter tray and the filter driving section are provided but if the subject's status when those images with parallax are captured changes when a color image is captured, then the parallax images and the color image are not captured in the same state. That is to say, these two kinds of images cannot be obtained at the same time, which is also a problem.

It is therefore an object of the present invention to provide an image capturing technique for capturing multiple images with parallax without providing any such mechanical driving section for its image capturing system. According to a preferred embodiment of the present invention, those images with parallax and an image that is free from a sensitivity problem can be captured at the same time.

Solution to Problem

A 3D image capture device according to the present invention includes: a light transmitting member having a polarizing area that transmits only a light ray that is polarized in a particular direction and a non-polarizing area that transmits any light ray irrespective of its polarization direction; and a solid-state image sensor, which is arranged to receive the light ray transmitted through the light transmitting member and which includes a pixel array and a filter array. The pixel array is divided into a number of pixel blocks, each of which includes first and second pixels, while the filter array includes a polarization filter that is arranged to face the first pixel and makes at least part of the light ray that has been transmitted through the polarizing area incident on the first pixel. The device further includes an imaging section for producing an image on the imaging area of the solid-state image sensor, and an image generating section for generating images based on the light ray that has entered the polarizing area and on the light ray that has entered the non-polarizing area, respectively, in response to first and second pixel signals supplied from the first and second pixels.

In one preferred embodiment, the transmission axis directions of the polarizing area and the polarization filter agree with each other.

In another preferred embodiment, if the polarizing area and the polarization filter are called a first polarizing area and a first polarization filter, respectively, the light transmitting member further has a second polarizing area, of which the transmission axis crosses the transmission axis of the first polarizing area at right angles. Each pixel block further includes a third pixel. The filter array further includes a second polarization filter, which has a transmission axis that runs in a different direction from the transmission axis of the first polarization filter and which is arranged to face the third pixel. The image generating section generates images based on the light ray that has entered the polarizing area and on the light ray that has entered the non-polarizing area, respectively, in response to not only the first and second pixel signals but also a third pixel signal supplied from the third pixel.

In this particular preferred embodiment, the first and second polarizing areas are arranged symmetrically with respect to the center of the light transmitting member.

In another preferred embodiment, the second pixel is arranged adjacent to the first and third pixels.

In still another preferred embodiment, the first and second polarizing areas are spaced apart from each other.

In yet another preferred embodiment, the image generating section adds the image signal generated based on the light ray that has entered the non-polarizing area to the image signals generated based on the light rays that have entered the first and second polarizing areas, respectively, thereby generating image signals associated with the first and second polarizing areas.

In a specific preferred embodiment, each pixel block is comprised of eight pixels that are arranged in four rows and two columns. The first, second and third pixels are arranged at a row 2, column 2 position, a row 1, column 2 position, and a row 4, column 2 position, respectively. Cyan filters for transmitting a light ray falling within a cyan wavelength range are arranged to face a pixel at a row 1, column 1 position and a pixel at a row 3, column 1 position, respectively. Yellow filters for transmitting a light ray falling within a yellow wavelength range are arranged to face a pixel at a row 2, column 1 position and a pixel at a row 4, column 1 position, respectively. Transparent members are arranged to face the pixel at the row 1, column 2 position and a pixel at a row 3, column 2 position. The first and second polarization filters are arranged to face the pixel at the row 2, column 2 position and the pixel at the row 4, column 2 position, respectively.

In another specific preferred embodiment, each pixel block is comprised of eight pixels that are arranged in four rows and two columns. The first, second and third pixels are arranged at a row 2, column 1 position, a row 1, column 2 position, and a row 4, position, respectively. Cyan filters for transmitting a light ray falling within a cyan wavelength range are arranged to face a pixel at a row 1, column 1 position and a pixel at a row 3, column 1 position, respectively. Yellow filters for transmitting a light ray falling within a yellow wavelength range are arranged to face a pixel at a row 2, column 2 position and a pixel at a row 4, column 2 position, respectively. Transparent members are arranged to face the pixel at the row 1, column 2 position and a pixel at a row 3, column 2 position. The first and second polarization filters are arranged to face the pixel at the row 2, column 1 position and the pixel at the row 4, column 1 position, respectively.

In another specific preferred embodiment, each pixel block is comprised of eight pixels that are arranged in four rows and two columns. The first, second and third pixels are arranged at a row 2, column 2 position, a row 1, column 2 position, and a row 4, column 2 position, respectively. Red filters for transmitting a light ray falling within a red wavelength range are arranged to face a pixel at a row 1, column 1 position and a pixel at a row 3, column 1 position, respectively. Blue filters for transmitting a light ray falling within a blue wavelength range are arranged to face a pixel at a row 2, column 1 position and a pixel at a row 4, column 1 position, respectively. Green filters for transmitting a light ray falling within a green wavelength range are arranged to face the pixel at the row 1, column 2 position and a pixel at a row 3, column 2 position, respectively. The first polarization filter and another green filter for transmitting a light ray falling within the green wavelength range are arranged to face the pixel at the row 2, column 2 position. The second polarization filter and still another green filter for transmitting a light ray falling within the green wavelength range are arranged to face the pixel at the row 4, column 2 position.

In another specific preferred embodiment, each pixel block is comprised of eight pixels that are arranged in four rows and two columns. The first, second and third pixels are arranged at a row 2, column 1 position, a row 1, column 2 position, and a row 4, column 1 position, respectively. Red filters for transmitting a light ray falling within a red wavelength range are arranged to face a pixel at a row 1, column 1 position and a pixel at a row 3, column 1 position, respectively. Blue filters for transmitting a light ray falling within a blue wavelength range are arranged to face a pixel at a row 2, column 2 position and a pixel at a row 4, column 2 position, respectively. Green filters for transmitting a light ray falling within a green wavelength range are arranged to face the pixel at the row 1, column 2 position and a pixel at a row 3, column 2 position, respectively. The first polarization filter and another green filter for transmitting a light ray falling within the green wavelength range are arranged to face the pixel at the row 2, column 1 position. The second polarization filter and still another green filter for transmitting a light ray falling within the green wavelength range are arranged to face the pixel at the row 4, column 1 position.

In another specific preferred embodiment, each pixel block is comprised of eight pixels that are arranged in four rows and two columns. The first, second and third pixels are arranged at a row 2, column 2 position, a row 1, column 2 position, and a row 4, column 2 position, respectively. Red filters for transmitting a light ray falling within a red wavelength range are arranged to face a pixel at a row 1, column 1 position and a pixel at a row 3, column 1 position, respectively. Blue filters for transmitting a light ray falling within a blue wavelength range are arranged to face a pixel at a row 2, column 1 position and a pixel at a row 4, column 1 position, respectively. Transparent members are arranged to face the pixel at the row 1, column 2 position and a pixel at a row 3, column 2 position. The first and second polarization filters are arranged to face the pixel at the row 2, column 2 position and the pixel at the row 4, column 2 position, respectively.

In another specific preferred embodiment, each pixel block is comprised of eight pixels that are arranged in four rows and two columns. The first, second and third pixels are arranged at a row 2, column 1 position, a row 1, column 2 position, and a row 4, column 1 position, respectively. Red filters for transmitting a light ray falling within a red wavelength range are arranged to face a pixel at a row 1, column 1 position and a pixel at a row 3, column 1 position, respectively. Blue filters for transmitting a light ray falling within a blue wavelength range are arranged to face a pixel at a row 2, column 2 position and a pixel at a row 4, column 2 position, respectively. Transparent members are arranged to face the pixel at the row 1, column 2 position and a pixel at a row 3, column 2 position. The first and second polarization filters are arranged to face the pixel at the row 2, column 1 position and the pixel at the row 4, column 1 position, respectively.

In yet another preferred embodiment, the image generating section makes computations on pixels signals supplied from the eight pixels, thereby generating two images based on the light rays that have entered the first and second polarizing areas, respectively, and a color image.

In yet another preferred embodiment, each pixel block further includes a fourth pixel. The first, second, third and fourth pixels are arranged in two rows and two columns. A first color filter for transmitting a light ray falling within a first wavelength range is arranged to face the second pixel. And a second color filter for transmitting a light ray falling within a second wavelength range is arranged to face the fourth pixel.

In this particular preferred embodiment, the first and second wavelength ranges correspond to the red and blue wavelength ranges, respectively.

Advantageous Effects of Invention

A 3D image capture device according to the present invention includes a light transmitting member having a polarizing area and a non-polarizing area, and an image sensor with a first group of pixels for which polarization filters are provided and a second group of pixels for which no polarization filters are provided. Thus, by making computations on the signals supplied from the first and second groups of pixels, images can be generated based on the light rays that have entered the polarizing area and the non-polarizing area, respectively. That is to say, multiple images with parallax can be obtained. In addition, since an image can be generated based on the light ray that has been transmitted through the non-polarizing area, an image can also be generated without decreasing its sensitivity. Consequently, the 3D image capture device of the present invention can generate both multiple images with parallax and an image that is free from the sensitivity problem at the same time just by performing simple signal arithmetic operations without using any mechanical driving section.

DESCRIPTION OF EMBODIMENTS

Figure 1:
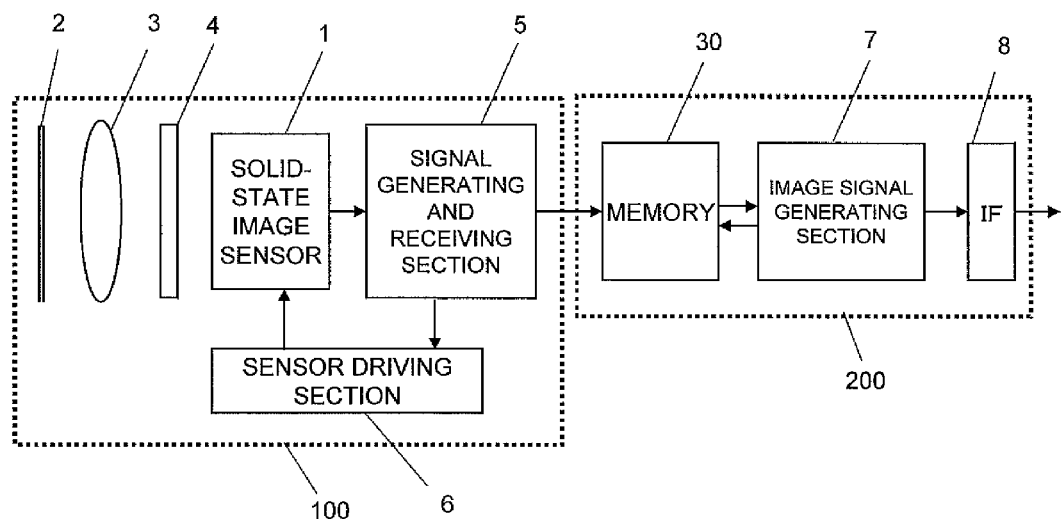
FIG. 1 illustrates an overall configuration for an image capture device as a preferred embodiment of the present invention.

Hereinafter, preferred embodiments of the present invention will be described with reference to the accompanying drawings. In the following description, any element shown in multiple drawings and having substantially the same function will be identified by the same reference numeral. It should be noted that a signal or information representing an image will sometimes be referred to herein as just an "image". And multiple images with parallax will sometimes be referred to herein as "multi-viewpoint images".

(Embodiment 1)

First of all, a First Specific Preferred Embodiment of the present invention will be described. FIG. 1 is a block diagram illustrating an overall configuration for a 3D image capture device as a first preferred embodiment of the present invention. The image capture device of this preferred embodiment is a digital electronic camera and includes an image capturing section 100 and a signal processing section 200 that receives a signal from the image capturing section 100 and outputs a signal representing an image (i.e., an image signal).

The image capturing section 100 includes an image sensor 1 with a number of photosensitive cells (pixels) that are arranged on its imaging area, a light transmitting plate 2 with a polarizing area that transmits only the light polarized in a particular direction and a non-polarizing area that transmits any light ray irrespective of its polarization direction, an optical lens 3 for producing an image on the imaging area of the image sensor 1, and an infrared cut filter 4. The image capturing section 100 further includes a signal generating and receiving section 5, which not only generates a fundamental signal to drive the image sensor 1 but also receives the output signal of the image sensor 1 and sends it to the signal processing section 200, and a sensor driving section 6 for driving the image sensor 1 in accordance with the fundamental signal generated by the signal generating and receiving section 5. The image sensor 1 is typically a CCD or CMOS sensor, which may be fabricated by known semiconductor device processing technologies. The signal generating and receiving section 5 and the sensor driving section 6 may be implemented as an LSI such as a CCD driver.

The signal processing section 200 includes an image signal generating section 7 for generating an image signal by processing the signal supplied from the image capturing section 100, a memory 30 for storing various kinds of data that have been produced while the image signal is being generated, and an interface (I/F) section 8 for sending out the image signal thus generated to an external device. The image signal generating section 7 is preferably a combination of a hardware component such as a known digital signal processor (DSP) and a software program for use to perform image processing involving the image signal generation. The memory 30 may be a DRAM, for example. And the memory 30 not only stores the signal supplied from the image capturing section 100 but also temporarily retains the image data that has been generated by the image signal generating section 7 or compressed image data. These image data are then output to either a storage medium or a display section (neither is shown) by way of the interface section 8.

The image capture device of this preferred embodiment actually further includes an electronic shutter, a viewfinder, a power supply (or battery), a flashlight and other known components. However, the description thereof will be omitted herein because none of them are essential components that would make it difficult to understand how the present invention works unless they were described in detail.

Next, the configuration of the image capturing section 100 will be described in further detail with reference to FIGS. 2 through 4.

Figure 2:
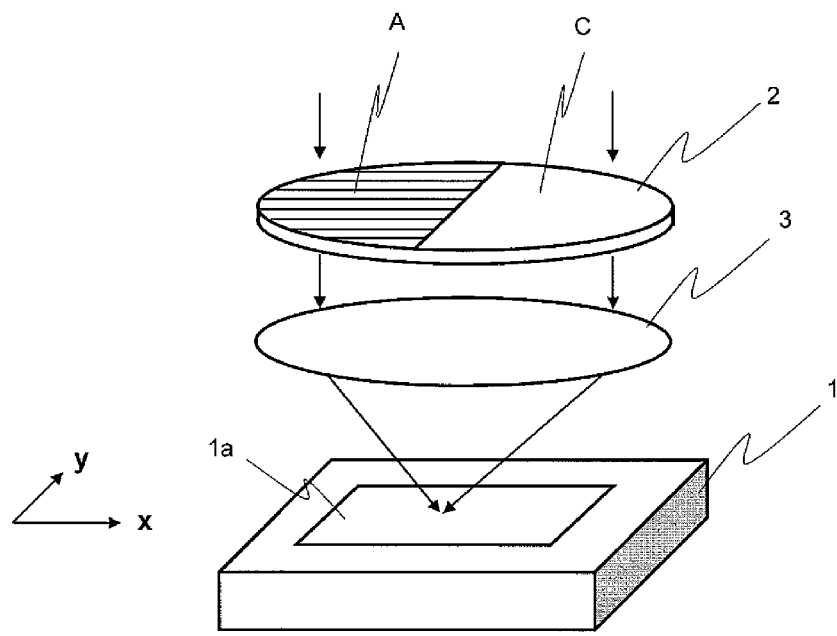
FIG. 2 schematically illustrates the relative arrangement of a light transmitting plate, a lens and an image sensor in a first preferred embodiment of the present invention.

FIG. 2 schematically illustrates the relative arrangement of the light transmitting plate 2, the optical lens 3 and the image sensor 1 in the image capturing section 100. It should be noted that illustration of the other elements is omitted in FIG. 2. The light transmitting plate 2 has a polarizing area A and a non-polarizing area (transparent area) C and transmits the incoming light. The optical lens 3 is a known lens and condenses the light that has been transmitted through the light transmitting plate 2, thereby imaging the light on the imaging area 1a of the image sensor 1. In the following description, the direction that points from the center of the polarizing area A toward that of the non-polarizing area C will be referred to herein as "x direction" and the direction that is defined on a plane parallel to the imaging area 1a and perpendicularly to the x direction will be referred to herein as "y direction".

Figure 3:
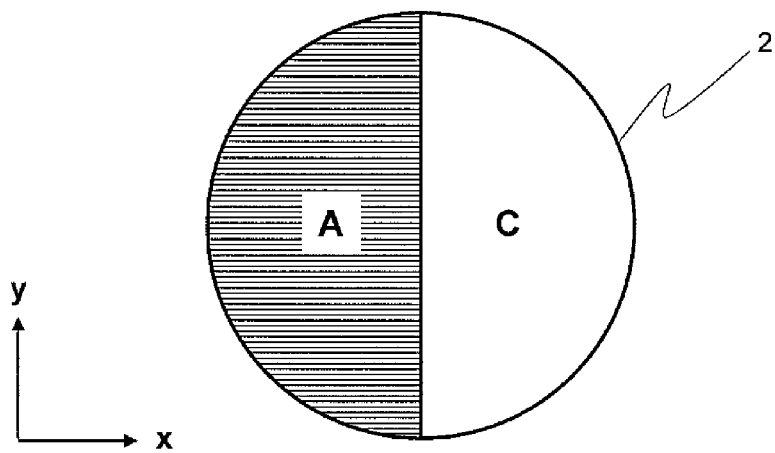
FIG. 3 is a front view of the light transmitting plate of the first preferred embodiment of the present invention.

FIG. 3 is a front view of the light transmitting plate 2 of this preferred embodiment. The light transmitting plate 2, as well as the optical lens 3, has a circular shape in this example but may also have any other shape. In FIG. 2, a half of the light transmitting plate 2 on the left hand side is a polarizing area A, of which the transmission axis is defined in the x direction (i.e., the horizontal direction), while the other half of the light transmitting plate 2 on the right hand side is a transparent area C that transmits the incoming light irrespective of its polarization direction. The polarizing area A may be made of a known polarizer, for example. On the other hand, the transparent area C may be any member as long as it can transmit the incoming light with high transmittance. In this preferred embodiment, the light transmitting plate 2 functions as the light transmitting member as defined in the claims. In FIG. 3, the light transmitting plate 2 is illustrated as consisting of only the polarizing area A and the transparent area C. Optionally, however, part of the light transmitting plate 2 may be made of an opaque material.

On the imaging area 1a of the image sensor 1 shown in FIG. 2, there is an array of photosensitive cells (pixels) that are arranged two-dimensionally. Such an array of photosensitive cells will be referred to herein as a "pixel array". In addition, a filter array, including multiple polarization filters and color filters, is also arranged on the light incident side of the image sensor 1 so as to face the pixel array. Each of those pixels typically includes a photodiode and photoelectrically converts the incoming light into an electrical signal representing the intensity of that light received. Such an electrical signal will be referred to herein as either a "photoelectrically converted signal" or a "pixel signal". In this preferred embodiment, a set of four neighboring pixels form one pixel block and two color filters, one transparent member and one polarization filter are provided for those four pixels that form each pixel block.

Figure 4:
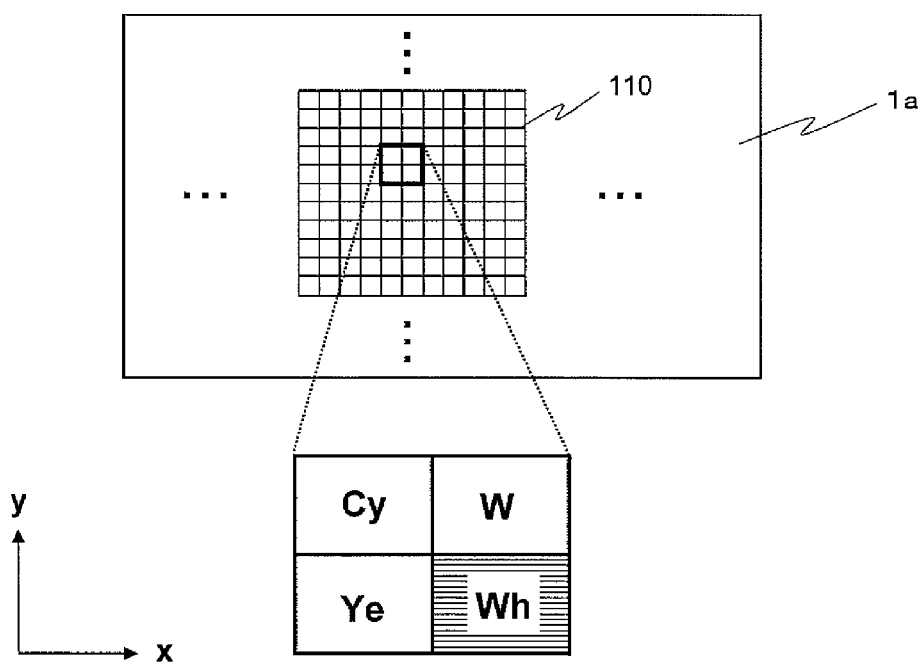
FIG. 4 illustrates a basic color scheme on the imaging area of a solid-state image sensor according to the first preferred embodiment of the present invention.

FIG. 4 schematically illustrates a part of the filter array 110 that is arranged on the imaging area 1a. The filter array 110 is arranged so that at least a part of the light ray that has been transmitted through the polarizing area A and at least a part of the light ray that has been transmitted through the non-polarizing area C are incident on each of those pixels. In each pixel block, a color filter for transmitting a light ray falling within a cyan wavelength range (that covers the blue and green wavelength ranges) is arranged to face the pixel at the row 1, column 1 position. Such a color filter will be referred to herein as a "cyan element Cy". A color filter for transmitting a light ray falling within a yellow wavelength range (that covers the green and red wavelength ranges) is arranged to face the pixel at the row 2, column 1 position. Such a color filter will be referred to herein as a "yellow element Ye". A transparent member that transmits the incoming visible radiation irrespective of its wavelength or polarization direction is arranged to face the pixel at the row 1, column 2 position. Such a member will be referred to herein as a "transparent element W". And a polarization filter, of which the transmission axis is defined in the x direction, is arranged to face the pixel at the row 2, column 2 position. Such a filter will be referred to herein as a "polarizing element Wh". Optionally, the transparent element W may be replaced with the air. These elements Cy, W, Ye and Wh do not always have to be arranged as shown in FIG. 4 but may also have their arrangement changed into any other pattern. Also, the tetragonal lattice pixel arrangement shown in FIG. 4 may be replaced with an oblique pixel arrangement in which pixels are arranged obliquely with respect to the x and y directions. In the following description, the cyan, yellow, transparent and polarizing elements will sometimes be collectively referred to herein as "color elements".

With such an arrangement adopted, the light entering this image capture device during shooting passes through the light transmitting plate 2, the optical lens 3, the infrared cut filter 4 and the filter array 110 and then is incident on the pixels. Each of those pixels receives the light ray that has been transmitted through the polarizing area A of the light transmitting plate 2 and the light that has been transmitted through the transparent area C thereof and outputs pixel signals representing the intensity of the light received. Pixel signals are output from each pixel to the signal processing section 200 by way of the signal generating and receiving section 5. The image signal generating section 7 of the signal processing section 200 generates multi-viewpoint images based on the signals supplied from the image capturing section 100.

Hereinafter, it will be described specifically what pixel signals are output by each pixel. First of all, a pixel signal generated based on the light ray that has been transmitted through either the W element or the Wh element and then photoelectrically converted by the pixel that faces that element will be described. In this case, the polarizing area A of the light transmitting plate 2 and the Wh element are supposed to have the same polarization property. Specifically, supposing the polarizing area A of the light transmitting plate 2 has an optical transmittance of 100%, the level of a signal representing the intensity of the light ray that has been transmitted through that area A, the optical lens 3, and the infrared cut filter 4 and then photoelectrically converted will be identified herein by As. On the other hand, the level of a signal representing the intensity of the light ray that has been transmitted through the area C of the light transmitting plate 2, the optical lens 3, and the infrared cut filter 4 and then photoelectrically converted will be identified herein by Cs. Since the polarizing area A of the light transmitting plate 2 does not actually have a transmittance of 100%, the actual transmittance of that area A will be identified herein by T1. Also, the optical transmittance to be obtained when two polarizers with the same transmission axis direction are stacked one upon the other will be identified herein by T1×T2. Meanwhile, the transparent area C of the light transmitting plate 2 is supposed to have an optical transmittance of 100%.

Furthermore, the level of a signal representing the intensity of the light ray that has been transmitted through the W element and then photoelectrically converted by the pixel that faces the W element will be identified herein by Sw. Also, the level of a signal representing the intensity of the light ray that has been transmitted through the polarizing area A of the light transmitting plate 2, the optical lens 3, and the infrared cut filter 4 and then photoelectrically converted can be calculated by T1×As. Since the level of a signal representing the intensity of the light ray that has been transmitted through the transparent area C of the light transmitting plate 2, the optical lens 3, and the infrared cut filter 4 and then photoelectrically converted is Cs, the signal level Sw is given by the following Equation (1):

$$Sw = T1 \times As + Cs \qquad (1)$$

If the level of a signal representing the intensity of the light ray that has been transmitted through the Wh element and then photoelectrically converted by the pixel that faces the Wh element is identified by Swh, the level of a signal representing the intensity of the light ray that has been transmitted through the polarizing area A of the light transmitting plate 2, the optical lens 3, and the infrared cut filter 4 and then photoelectrically converted can be calculated by T1×T2×As. Since the level of a signal representing the intensity of the light ray that has been transmitted through the transparent area C of the light transmitting plate 2, the optical lens 3, and the infrared cut filter and then photoelectrically converted is obtained by T1×Cs, the signal level Swh is given by the following Equation (2):

$$Swh = T1 \times T2 \times As + T1 \times Cs \qquad (2)$$

Based on these Equations (1) and (2), it is possible to calculate the image signal As representing the intensity of the light ray that has been transmitted through the polarizing area A of the light transmitting plate 2 and then photoelectrically converted and the image signal Cs representing the intensity of the light ray that has been transmitted through the transparent area C of the light transmitting plate 2 and then photoelectrically converted. That is to say, As and Cs can be respectively given by the following Equations (3) and (4):

$$As=(Sw-Swh/T1)/(T1-T2) \quad (3)$$

$$Cs=(Swh-T2 \times Sw)/(T1-T2) \quad (4)$$

By performing these computations on a pixel block basis, the image signal generating section 7 calculates As and Cs for each pixel block. A set of those signal levels As thus calculated represents the image generated based on the light ray that has entered the polarizing area A, while a set of those signal levels Cs thus calculated represents the image generated based on the light ray that has entered the transparent area C. In this manner, according to the present invention, two images with parallax can be generated by making simple computations between those pixels.

On the other hand, a color image can be generated in the following manner based on the level Scy of a signal representing the intensity of the light ray that has been transmitted through the cyan element and then photoelectrically converted, the level Sye of a signal representing the intensity of the light ray that has been transmitted through the yellow element and then photoelectrically converted, and the level Sw of a signal representing the intensity of the light ray that has been transmitted through the W element and then photoelectrically converted. Specifically, information Sr about the color red can be obtained by calculating (Sw−Scy). Information Sb about the color blue can be obtained by calculating (Sw−Sye). And information about the color green can be obtained by calculating (Sw−Sr−Sb). By performing these computations, an RGB color image can be generated easily. As a result, according to this preferred embodiment, just the light that has been lost at the polarizing area A of the light transmitting plate 2 is the quantity of the light that cannot be used efficiently. And supposing the decrease in the quantity of light at that area is 50%, a color image that can use 75% of the incoming light by adding the quantity of the light transmitted through the transparent area C can be obtained.

As described above, in the image capture device of this preferred embodiment, pixels are arranged in two rows and two columns so as to form a 2×2 matrix as a fundamental unit, and two color filters, one polarization filter and one transparent member are arranged to face those four pixels. Specifically, a cyan element (Cy) is arranged at the row 1, column 1 position, a transparent element (W) is arranged at the row 1, column 2 position, a yellow element (Ye) is arranged at the row 2, column 1 position, and a polarizing element (Wh) that transmits only the light polarized in the x direction is arranged at the row 2, column 2 position. The light transmitting plate 2 is designed so that a half of the plate 2 shown on the left hand side of FIG. 3 transmits only the light polarized in the x direction and that the other half thereof shown on the right hand side transmits the incoming light irrespective of its polarization direction. By making computations on the pixel signals supplied from the two pixels that face the transparent element W and the polarizing element Wh, respectively, two images with parallax can be generated. Also, by making computations on the pixel signals supplied from the three pixels that face the cyan element Cy, the yellow element Y and the transparent element W, respectively, a color image can be generated with the loss of the quantity of light used reduced to only about 25% of the incoming light. That is to say, according to this preferred embodiment, not only multi-viewpoint images but also a color image generated at a much lower loss of the quantity of light used can be obtained at the same time just by making simple computations between those image signals without using any mechanical driving section unlike the prior art.

In the preferred embodiment described above, the polarizing area A and the transparent area C of the light transmitting plate 2 are supposed to have the same planar area. However, the color image can be generated by using the incoming light even more efficiently with the ratio of the transparent area C increased. In that case, however, the accuracy of the parallax could decrease. Since a tradeoff is inevitable between the optical efficiency achieved in generating a color image and the accuracy of parallax, it is a matter of design to be appropriately determined how high the ratio of the transparent area C should be set. Also, although cyan, yellow, transparent and polarizing elements are used in the preferred embodiment described above as shown in FIG. 4, it is not always necessary to adopt such a color scheme because a color image can be generated as long as three color elements that transmit light falling within three different wavelength ranges are used. Moreover, the color scheme shown in FIG. 4 does not have to be used, either. For example, the cyan and yellow elements may be replaced with a blue filter (blue element B) that transmits light falling within the blue wavelength range and a red filter (red element R) that transmits light falling within the red wavelength range. Optionally, a color filter may also be arranged to face a pixel for which the polarizing element Wh is already provided. For example, a green filter that transmits light falling within the green wavelength range may be arranged on the optical path of the light to be transmitted through the polarizing element Wh and the transparent element W may be replaced with another green filter. Anyway, if four color elements are arranged, the two elements in the same color are preferably either transparent elements or green elements representing the color green that is relatively easily conforms to the human luminosity property. Furthermore, as long as four color elements are arranged with respect to four pixels, those elements may be arranged in any arbitrary pattern.

Also, in the preferred embodiment described above, the light transmitting plate 2 is split into two by a centerline so that a half of the plate 2 on the left hand side defines the polarizing area A and the other half thereof defines the transparent area C as shown in FIG. 3. However, these two areas do not always have to contact with each other. Instead, the polarizing area A and the transparent area C may be spaced apart from each other with an opaque member interposed between them.

Furthermore, in the preferred embodiment described above, the polarizing area A of the light transmitting plate 2 and the polarizing element Wh of the image sensor 1 have the same transmission axis direction. However, their transmission axes may be defined in different directions, too. If the transmission axis of the polarizing area A of the light transmitting plate 2 and that of the polarizing element Wh of the image sensor 1 cross each other at some angle, then Equations (2) to (4) just need to be modified according to that angle.

Also, as for the configuration of the image capturing section 100, the arrangement of the respective elements thereof shown in FIG. 2 is just an example and does not always have to be adopted according to the present invention. For example, as long as an image can be produced on the imaging area 1a, the optical lens 3 may be arranged more distant from the image capture device 1. Alternatively, a number of lenses may be arranged and the light transmitting plate 2 may be interposed between them. Moreover, the lens 3 and the light transmitting plate 2 do not always have to be two independent elements but may also be combined together. Furthermore, the light transmitting plate 2 and the imaging area of the image capture device 1 are not necessarily arranged parallel to each other. Instead, by arranging an optical element 52 such as a mirror or a prism that reflects light between them, the light transmitting plate 2 and the imaging area of the image capture device 1 may also be arranged on two planes that intersect with each other.

(Embodiment 2)

Hereinafter, a second preferred embodiment of the present invention will be described. The image capture device of this second preferred embodiment is quite the same as its counterpart of the first preferred embodiment described above except the structures of the light transmitting plate 2 and the image capture device 1 and the processing performed by the image signal generating section 7. Thus, the following description of the second preferred embodiment will be focused on only those differences from the first preferred embodiment and their common features will not be described all over again to avoid redundancies.

Figure 5:
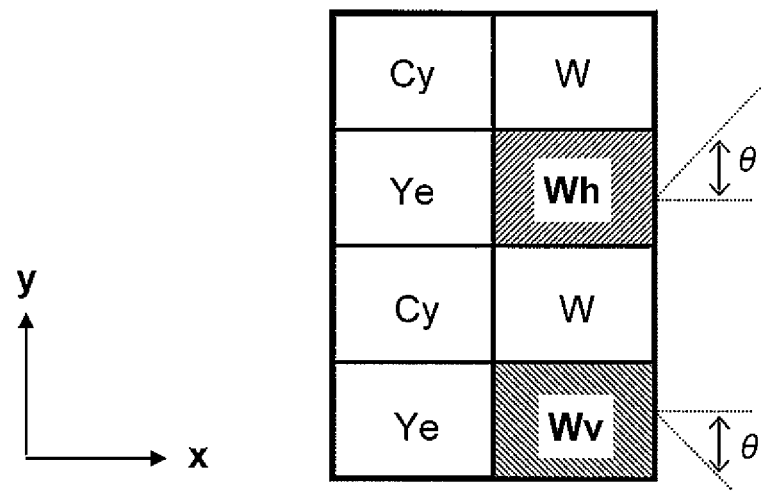
FIG. 5 illustrates a basic color scheme on the image capturing section of a solid-state image sensor according to a second preferred embodiment of the present invention.

FIG. 5 illustrates a basic color scheme on the imaging area of the solid-state image sensor 1 of this preferred embodiment. In this preferred embodiment, pixels are arranged in four rows and two columns so as to form a 4×2 matrix as a fundamental unit. Specifically, cyan elements (Cy) are arranged at a row 1, column 1 position and at a row 3, column 1 position. Transparent elements (W) are arranged at a row 1, column 2 position and at a row 3, column 2 position. Yellow elements (Ye) are arranged at a row 2, column 1 position and at a row 4, column 1 position. A polarizing element (Wh), of which the transmission axis defines an angle θ with respect to the x direction, is arranged at a row 2, column 2 position. And another polarizing element (Wv), of which the transmission axis defines an angle θ with respect to the y direction, is arranged at a row 4, column 2 position. The respective pixels of the solid-state image sensor 1 are provided one to one for these color elements so that each of those pixels faces an associated one of the color elements.

Figure 6:
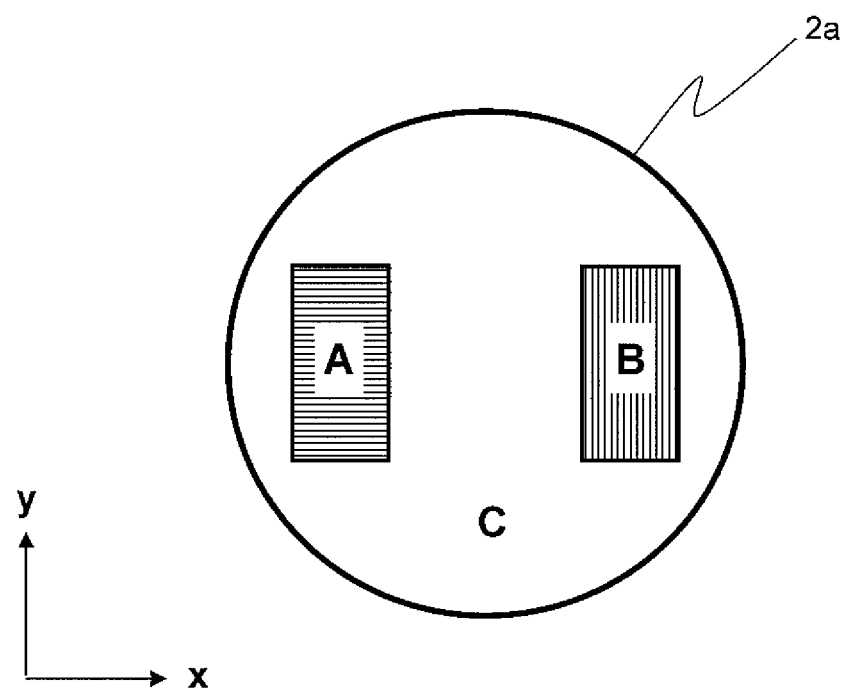
FIG. 6 is a front view of the light transmitting plate of the second preferred embodiment of the present invention.

FIG. 6 is a front view illustrating the light transmitting plate 2a of this preferred embodiment. This light transmitting plate 2a has a circular shape and has the same effective aperture as the optical lens 3. The light transmitting plate 2a has a rectangular polarizing area A that transmits only a component of the incoming light that is polarized in the x direction on the left hand side of FIG. 6 (and that will be referred to herein as a "left polarizing portion") and another polarizing area B of the same size that transmits only a component of the incoming light that is polarized in the y direction on the right hand side of FIG. 6 (and that will be referred to herein as a "right polarizing portion"). The rest of the light transmitting plate 2a other than these polarizing areas A and B is a transparent area C that is made of a light transmissive material and that transmits incoming light irrespective of its polarization direction. Thus, the light transmitting plate 2a of this preferred embodiment has two polarizing areas A and B that are arranged symmetrically with respect to its center. With such an arrangement, multi-viewpoint images can be generated based on the light rays entering these two polarizing areas A and B. It should be noted that the left and right polarizing portions do not always have to have such a rectangular shape.

First of all, a signal representing the intensity of the light ray that has been transmitted through the W, Wh or Wv element of such an arrangement and then photoelectrically converted by the pixel that faces that element will be described. In this case, the polarizing area A of the light transmitting plate 2a and the Wh and Wv elements are supposed to have the same polarization property except their transmission axis directions. Specifically, supposing the left polarizing portion of the light transmitting plate 2a has an optical transmittance of 100%, the level of a signal representing the intensity of the light ray that has been transmitted through that area, the optical lens 2, and the infrared cut filter 4 and then photoelectrically converted will be identified herein by As. In the same way, supposing the right polarizing portion of the light transmitting plate 2a has an optical transmittance of 100%, the level of a signal representing the intensity of the light ray that has been transmitted through that area, the optical lens 2, and the infrared cut filter 4 and then photoelectrically converted will be identified herein by Bs. On the other hand, the level of a signal representing the intensity of the light ray that has been transmitted through the transparent area C of the light transmitting plate 2a, the optical lens 2, and the infrared cut filter 4 and then photoelectrically converted will be identified herein by Cs. Since the polarizing area A of the light transmitting plate 2a does not actually have a transmittance of 100%, the actual transmittance of that area A will be identified herein by T1. Also, the optical transmittance to be obtained when two polarizers with the same polarization direction are stacked one upon the other will be identified herein by T1×T2.

Furthermore, the level of a signal representing the intensity of the light ray that has been transmitted through the W element and then photoelectrically converted by the pixel that faces the W element will be identified herein by Sw. Also, the level of a signal representing the intensity of the light ray that has been transmitted through the polarizing area A of the light transmitting plate 2a, the optical lens 3, and the infrared cut filter 4 and then photoelectrically converted can be calculated by T1×(As+Bs). Since the level of a signal representing the intensity of the light ray that has been transmitted through the transparent area C of the light transmitting plate 2a, the optical lens 3, and the infrared cut filter 4 and then photoelectrically converted is Cs, the signal level Sw is given by the following Equation (5):

$$Sw = T1 \times (As + Bs) + Cs \tag{5}$$

If the level of a signal representing the intensity of the light ray that has been transmitted through the Wh element and then photoelectrically converted by the pixel that faces the Wh element is identified by Swh, the level of a signal representing the intensity of the light ray that has been transmitted through the left polarizing portion of the light transmitting plate 2a, the optical lens 3, and the infrared cut filter 4 and then photoelectrically converted can be calculated by T1×T2×As cos θ. On the other hand, the level of a signal representing the intensity of the light ray that has been transmitted through the right polarizing portion of the light transmitting plate 2a, the optical lens, and the infrared cut filter and then photoelectrically converted can be calculated by T1×T2×Bs sin θ. Since the level of a signal representing the intensity of the light ray that has been transmitted through the transparent area C of the light transmitting plate 2a, the optical lens, and the infrared cut filter and then photoelectrically converted is obtained by T1×Cs, the signal level Swh is given by the following Equation (6):

$$Swh = T1 \times (T2 \times As \cos \theta + T2 \times Bs \sin \theta + Cs) \tag{6}$$

If the level of a signal representing the intensity of the light ray that has been transmitted through the Wv element and then photoelectrically converted by the pixel that faces the Wv element is identified by Swv, the level of a signal representing the intensity of the light ray that has been transmitted through the left polarizing portion of the light transmitting plate 2a, the optical lens, and the infrared cut filter and then photoelectrically converted can be calculated by T1×T2×As sin θ. On the other hand, the level of a signal representing the intensity of the light ray that has been transmitted through the right polarizing portion of the light transmitting plate 2a, the optical lens, and the infrared cut filter and then photoelectrically converted can be calculated by T1×T2×Bs cos θ. Since the level of a signal representing the intensity of the light ray that has been transmitted through the transparent area C of the light transmitting plate 2a, the optical lens, and the infrared cut filter and then photoelectrically converted is obtained by T1×Cs, the signal level Swv is given by the following Equation (7):

$$Swv = T1 \times (T2 \times As \sin\theta + T2 \times Bs \cos\theta + Cs) \quad (7)$$

Based on these Equations (5), (6) and (7), it is possible to calculate the image signal As representing the intensity of the light ray that has been transmitted through the left polarizing portion of the light transmitting plate 2a and then photoelectrically converted, the image signal Bs representing the intensity of the light ray that has been transmitted through the right polarizing portion of the light transmitting plate 2a and then photoelectrically converted, and the image signal Cs representing the intensity of the light ray that has been transmitted through the transparent area C of the light transmitting plate 2a and then photoelectrically converted. That is to say, As, Bs and Cs can be respectively given by the following Equations (8), (9) and (10):

$$As = \{T2(\sin\theta - \cos\theta)Sw + (k\cos\theta - 1)Swh + (1 - k\sin\theta)swv\}/D \quad (8)$$

$$Bs = \{T2(\sin\theta - \cos\theta)Sw + (1 - k\sin\theta)Swh + (k\cos\theta - 1)Swv\}/D \quad (9)$$

$$Cs = (T2(\sin\theta + \cos\theta)Sw - Swh - Swv)/E \quad (10)$$

where k, D and E are represented by the following Equations (11), (12) and (13), respectively:

$$k = T2/T1 \quad (11)$$

$$D = T2(\sin\theta - \cos\theta)(2T1 - T2(\sin\theta + \cos\theta)) \quad (12)$$

$$E = T2(\sin\theta + \cos\theta) - 2T1 \quad (13)$$

As can be seen, according to this preferred embodiment, signals As and Bs representing multi-viewpoint images and a signal Cs representing an image that uses incoming light highly efficiently can be generated just by making simple computations between pixel signals. The image signal Cs does not represent an image with parallax but may have a portion similar to the multi-viewpoint image signals As and Bs. That is why if the image signal Cs is added to the multi-viewpoint image signals As and Bs for such a similar portion, the multi-viewpoint images can also be generated with the light used more efficiently.

Figure 7:
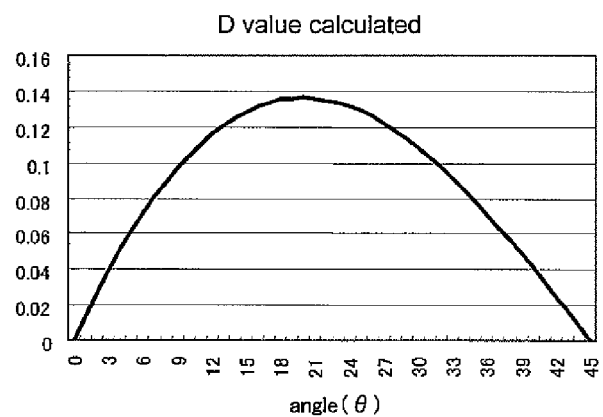
FIG. 7 shows how the D value changes with the angle of polarization in the second preferred embodiment of the present invention.
Figure 8:
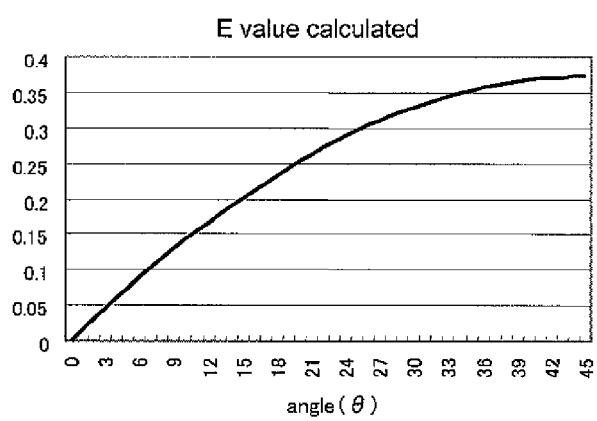
FIG. 8 shows how the E value changes with the angle of polarization in the second preferred embodiment of the present invention.

These Equations (8) to (10) are expressed in common fractions. For that reason, the bigger their denominator, the smaller the computational error should be. D and E were calculated with plastic polarization films supposed to be used, with T1 and T2 set to be 0.45 and 0.9, respectively, and with θ changed within the range of 0 to 45 degrees. The results are shown in FIGS. 7 and 8. These results reveal that the angle θ that maximized the D value was 20 degrees and that the angle θ that maximized the E value was 45 degrees. However, as the D value goes zero when θ=45 degrees, the D value is preferably given a higher priority and a θ value of 20 degrees is preferably used as a design value.

On the other hand, a color image can be generated in the following manner based on the level Scy of a signal representing the intensity of the light ray that has been transmitted through the cyan elements and then photoelectrically converted, the level Sye of a signal representing the intensity of the light ray that has been transmitted through the yellow elements and then photoelectrically converted, and the level Sw of a signal representing the intensity of the light ray that has been transmitted through the W elements and then photoelectrically converted as in the first preferred embodiment described above. Specifically, information Sr about the color red can be obtained by calculating (Sw−Scy). Information Sb about the color blue can be obtained by calculating (Sw−Sye). And information about the color green can be obtained by calculating (Sw−Sr−Sb). By performing these computations, an RGB color image can be generated easily. As a result, according to this preferred embodiment, just the light that has been lost at the polarizing area A of the light transmitting plate 2 is the quantity of the light that cannot be used efficiently. Consequently, by adding the quantity of the light transmitted through the transparent area C, a color image can be generated with a significantly smaller percentage of the incoming light wasted.

As described above, in the image capture device of this preferred embodiment, pixels are arranged in four rows and two columns so as to form a 4×2 matrix as a fundamental unit, and two Cy elements, two Ye elements, two transparent elements and two polarizing elements are arranged to face those eight pixels. Specifically, cyan elements (Cy) are arranged at a row 1, column 1 position and at a row 3, column 1 position. Transparent elements (W) are arranged at a row 1, column 2 position and at a row 3, column 2 position. Yellow elements (Ye) are arranged at a row 2, column 1 position and at a row 4, column 1 position. A polarizing element (Wh), of which the transmission axis defines an angle θ with respect to the x direction, is arranged at a row 2, column 2 position. And another polarizing element (Wv), of which the transmission axis defines an angle θ with respect to the y direction, is arranged at a row 4, column 2 position. The light transmitting plate 2a has a left polarizing portion, of which the transmission axis direction agrees with the x direction, on the left hand side of FIG. 6 and a right polarizing portion, which has the same size as the left polarizing portion and of which the transmission axis direction agrees with the y direction, on the right hand side of FIG. 6. By making computations on the signals supplied from the pixels that face the transparent elements W and the signals supplied from the pixels that face the polarizing elements Wh and Wv, multi-viewpoint images can be generated. Also, by making computations on the pixel signals supplied from the pixels that face the cyan elements Cy, the yellow elements Y and the transparent elements W, respectively, a color image can be generated with the sensitivity much less decreased. That is to say, as in the first preferred embodiment described above, not only multi-viewpoint images but also a color image that would cause a much less decrease in sensitivity can be obtained at the same time just by making simple computations between those image signals without using any mechanical driving section unlike the prior art.

In the preferred embodiment described above, the left and right polarizing portions of the light transmitting plate 2a are supposed to have a rectangular shape. However, this is only an example. Also, the transmission axes of the polarizing elements Wh and Wv are supposed to define the same angle θ with respect to the x and y directions, respectively, in the preferred embodiment described above but may also define respectively different angles. Furthermore, although cyan, yellow, transparent and polarizing elements are used in the preferred embodiment described above as shown in FIG. 6, it is not always necessary to adopt such a color scheme because a color image can be generated as long as three kinds of color elements with different transmitting wavelength ranges are used. Moreover, the color scheme shown in FIG. 6 does not have to be used, either. For example, the cyan and yellow elements may be replaced with a blue filter (blue element B) that transmits light falling within the blue wavelength range and a red filter (red element R) that transmits light falling within the red wavelength range. Optionally, a color filter may also be arranged to face a pixel for which the polarizing element Wh or Wv is already provided. For example, a green filter that transmits light falling within the green wavelength range may be arranged on the optical path of the light to be transmitted through the polarizing element Wh, Wv and the transparent element W may be replaced with another green filter. Anyway, if four kinds of color elements are arranged, the two elements in the same color are preferably either transparent elements or green elements representing the color green that is relatively easily conforms to the human luminosity property.

This preferred embodiment may be modified in the following manner, for example. (1) The two elements of at least one row of the arrangement shown in FIG. 5 may be changed with each other. (2) The Cy elements shown in FIG. 5 may be replaced with elements in one of the two colors red and blue and the Ye elements may be replaced with elements in the other color. (3) The two elements of at least one row of the arrangement (2) may be changed with each other. (4) The Cy filters shown in FIG. 5 may be replaced with elements in one of the two colors red and blue, the Ye elements may be replaced with elements in the other color, the W elements may be replaced with green elements, and green elements may be added to the Wh and Wv elements. And (5) the two elements of at least one row of the arrangement (4) may be changed with each other. In any of these modified examples, multi-viewpoint images and a color image that uses the incoming light highly efficiently can also be generated by performing similar signal arithmetic operations.

(Embodiment 3)

Figure 9:
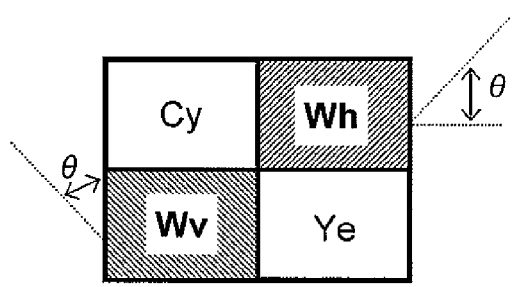
FIG. 9 illustrates a basic color scheme on the image capturing section of a solid-state image sensor according to a third preferred embodiment of the present invention.
Figure 10:
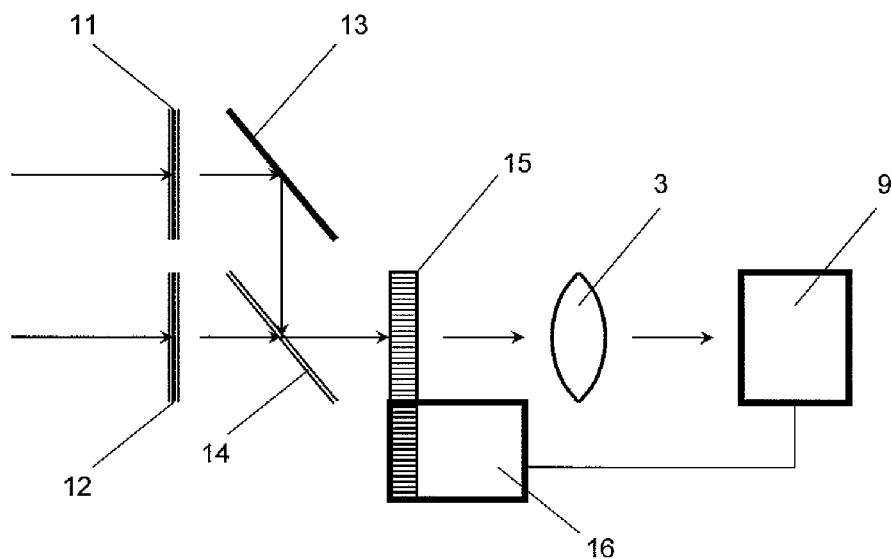
FIG. 10 illustrates the arrangement of an image capturing system disclosed in Patent Document No. 1.
Figure 11:
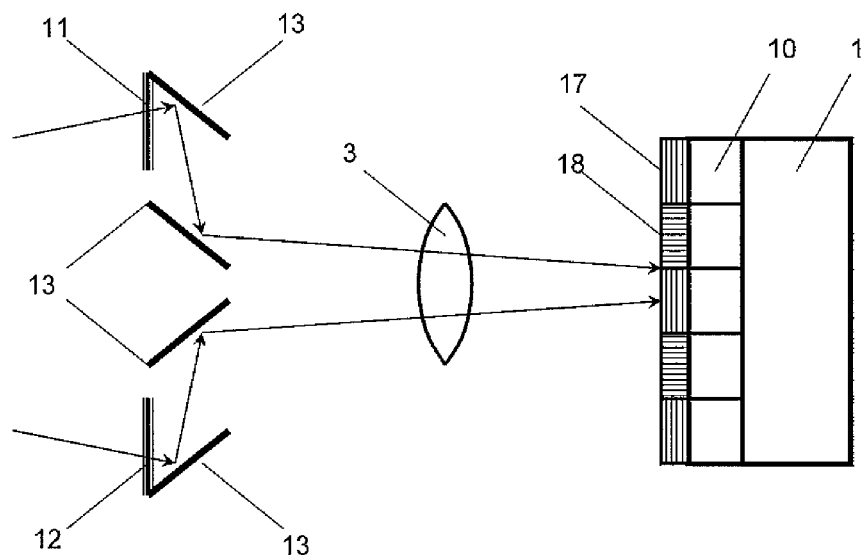
FIG. 11 illustrates the arrangement of an image capturing system disclosed in Patent Document No. 2.
Figure 12:
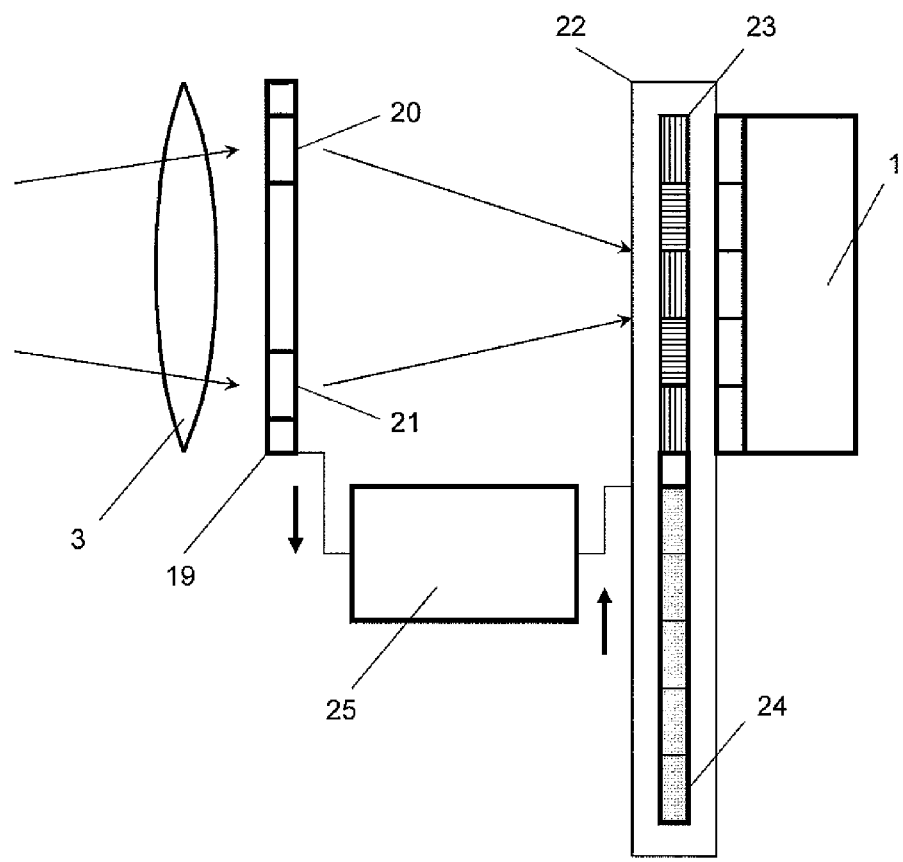
FIG. 12 illustrates the arrangement of an image capturing system disclosed in Patent Document No. 3.

Hereinafter, a third preferred embodiment of the present invention will be described. FIG. 9 illustrates a basic color scheme on the imaging area of the solid-state image sensor 1 of this preferred embodiment. These elements are arranged in two rows and two columns to form a 2×2 matrix as a fundamental unit. In this matrix, a cyan element (Cy) is arranged at a row 1, column 1 position, a polarizing element (Wh), of which the transmission axis defines an angle θ with respect to the x direction, is arranged at a row 2, column 1 position, a yellow element (Ye) is arranged at a row 1, column 2 position, and a polarizing element (Wv), of which the transmission axis defines the angle θ with respect to the y direction, is arranged at a row 2, column 2 position. Each pixel of the solid-state image sensor 1 is associated with, and located right under, one of these color elements. The light transmitting plate 2a used in this preferred embodiment is the same as that of the second preferred embodiment described above, and the description thereof will be omitted herein. Thus, the following description of the third preferred embodiment will be focused on only differences from the second preferred embodiment described above.

Since the arrangement of this preferred embodiment includes no W elements, the computations that are adopted in the second preferred embodiment are not applicable as they are. If a subject in almost an achromatic color is going to be captured, however, Cy+Ye=W+G. That is why if the photo-detector signal ratios of RGB are represented by Kr, Kg and Kb, respectively, a signal that should be generated through the W element could be obtained by multiplying the sum of the signals obtained through the Cy and Ye elements by (Kr+Kg+Kb)/(Kr+2Kg+Kb). Thus, if the result obtained by making such a computation is used as a signal representing the intensity of the light that has been photoelectrically converted by the pixel that faces the W element, then multi-viewpoint images can also be generated by performing the rest of the processing as in the second preferred embodiment described above.

On the other hand, a color image can be generated in the following manner based on the level Scy of a signal representing the intensity of the light ray that has been transmitted through the cyan element and then photoelectrically converted, the level Sye of a signal representing the intensity of the light ray that has been transmitted through the yellow element and then photoelectrically converted, the level Swh of a signal representing the intensity of the light ray that has been transmitted through the Wh element and then photoelectrically converted, and the level Swv of a signal representing the intensity of the light ray that has been transmitted through the Wv element and then photoelectrically converted. First of all, Swh and Swv are added together and the sum is supposed to represent the signal level Sw of the W element. Then, information Sr about the color red can be obtained by calculating (Sw−Scy). Information Sb about the color blue can be obtained by calculating (Sw−Sye). And information about the color green can be obtained by calculating (Sw−Sr−Sb). As a result, according to this preferred embodiment, just the light that has been lost at the polarizing area A of the light transmitting plate 2a is the quantity of the light that cannot be used efficiently. Consequently, by adding the quantity of the light transmitted through the transparent area C, a color image can be generated with a significantly smaller percentage of the incoming light wasted.

As described above, in this preferred embodiment, pixels are arranged in two rows and two columns so as to form a 2×2 matrix as a fundamental unit, and a Cy element, a Ye element, and two polarizing elements are arranged to face those four pixels. Specifically, a cyan element (Cy) is arranged at a row 1, column 1 position, a polarizing element (Wh), of which the transmission axis defines an angle θ with respect to the x direction, is arranged at a row 1, column 2 position, a yellow element (Ye) is arranged at a row 2, column position, and a polarizing element (Wv), of which the transmission axis defines the angle θ with respect to the y direction, is arranged at a row 2, column 2 position. The light transmitting plate 2a has a left polarizing portion, of which the transmission axis direction agrees with the x direction, on the left hand side of FIG. 6 and a right polarizing portion, which has the same size as the left polarizing portion and of which the transmission axis direction agrees with the y direction, on the right hand side of FIG. 6. By making computations on the signals supplied from the pixels that face the cyan element Cy, the yellow element Ye and the two polarizing elements Wh and Wv, multi-viewpoint images and a color image that would cause a much less decrease in sensitivity can be generated. That is to say, as in the first and second preferred embodiments described above, not only multi-viewpoint images but also a color image that would cause a much less decrease in sensitivity can be obtained at the same time just by making simple computations between those image signals without using any mechanical driving section unlike the prior art.

Although the color scheme shown in FIG. 9 is adopted in the preferred embodiment described above, the positions of the cyan, yellow and polarizing elements may be changed. Also, the cyan and yellow elements may be replaced with red and blue elements.

In the first, second and third preferred embodiments of the present invention, the image capture device is designed to obtain both multi-viewpoint images and a color image alike. However, the image capture device may also be designed to obtain only multi-viewpoint images. If the present invention is used to get only parallax information, the Cy and Ye elements shown in FIGS. 4, 5 and 9 may be omitted.

Optionally, the image capture device may also obtain the multi-viewpoint images and then subject them to differential processing to get a differential image. Furthermore, the image capture device may also obtain a so-called "disparity map", which is a parallax image representing the magnitude of shift in position between each pair of associated points on the images. By getting such a disparity map, information indicating the depth of the subject can be obtained.

In the first through third preferred embodiments of the present invention described above, a signal arithmetic operation is performed on a photoelectrically converted signal that has been obtained by capturing, thereby generating an image. However, such processing of generating an image through the signal arithmetic operations may be carried out by another device independently of the image capture device. In that case, the image capture device does not have to include the image signal generating section 7 shown in FIG. 1. Then, the same effect can also be achieved by loading a signal that has been obtained by an image capture device with the image capturing section 100 of the first through third preferred embodiments described above into another device and by getting a program defining the signal arithmetic processing of the preferred embodiments described above executed by that another device.

INDUSTRIAL APPLICABILITY

The 3D image capture device of the present invention can be used effectively in every camera that uses a solid-state image sensor, and may be used in digital still cameras, digital camcorders and other consumer electronic cameras and in industrial solid-state surveillance cameras, to name just a few.

REFERENCE SIGNS LIST

1 solid-state image sensor
1a imaging area
2 light transmitting plate
3 optical lens
4 infrared cut filter
5 signal generating and image signal receiving section
6 sensor driving section
7 image signal generating section
8 image interface section
9 image capture device
10 pixel
11 0-degree-polarization polarizer
12 90-degree-polarization polarizer
13 reflective mirror
14 half mirror
15 circular polarization filter
16 driver that rotates the polarization filter
17, 18 polarization filter
19 light transmitting member
20, 21 polarized light transmitting portion
22 light receiving member optical filter tray
23 particular component transmitting filter
24 color filter
25 filter driving section
30 memory
100 image capturing section
110 filter array
200 signal processing section

The invention claimed is:

1. A 3D image capture device comprising:
   a light transmitting member having a polarizing area that transmits only a light ray that is polarized in a particular direction and a non-polarizing area that transmits any light ray irrespective of its polarization direction;
   a solid-state image sensor, which is arranged to receive the light ray transmitted through the light transmitting member and which includes a pixel array and a filter array, the pixel array being divided into a number of pixel blocks, each of which includes first and second pixels, the filter array including a polarization filter that is arranged to face the first pixel and making at least part of the light ray that has been transmitted through the polarizing area and at least part of the light ray that has been transmitted through the non-polarizing area incident on the first pixel at the same time;
   an imaging section for producing an image on the imaging area of the solid-state image sensor; and
   an image generating section configured to calculate an image signal associated with the light ray that has entered the polarizing area and an image signal associated with the light ray that has entered the non-polarizing area, using a first pixel signal supplied from the first pixel and a second pixel signal supplied from the second pixel.

2. The 3D image capture device of claim 1, wherein transmission axis directions of the polarizing area and the polarization filter agree with each other.

3. The 3D image capture device of claim 1, wherein if the polarizing area and the polarization filter are called a first polarizing area and a first polarization filter, respectively,
   the light transmitting member further has a second polarizing area, of which the transmission axis crosses the transmission axis of the first polarizing area at right angles, and
   wherein each said pixel block further includes a third pixel, and
   wherein the filter array further includes a second polarization filter, which has a transmission axis that runs in a different direction from the transmission axis of the first polarization filter and which is arranged to face the third pixel, and
   wherein the image generating section generates a first image signal associated with the light ray that has entered the first polarizing area, and a second image signal associated with the light ray that has entered the second polarizing area and a third image signal associated with the light ray that has entered the non-polarizing area, using the first pixel signal, the second pixel signal, and a third pixel signal that is supplied from the third pixel.

4. The 3D image capture device of claim 3, wherein the first and second polarizing areas are arranged symmetrically with respect to the center of the light transmitting member.

5. The 3D image capture device of claim 3, wherein the second pixel is arranged adjacent to the first and third pixels.

6. The 3D image capture device of claim 3, wherein the first and second polarizing areas are spaced apart from each other.

7. The 3D image capture device of claim 3, wherein the image generating section generates an image signal associated with the first polarizing area by adding the third image signal to the first image signal and another image signal associated with the second polarizing area by adding the third image signal to the second image signal.

8. The 3D image capture device of claim 3, wherein each said pixel block is comprised of eight pixels that are arranged in four rows and two columns, and wherein the first, second and third pixels are arranged at a row 2, column 2 position, a row 1, column 2 position, and a row 4, column 2 position, respectively, and wherein cyan filters for transmitting a light ray falling within a cyan wavelength range are arranged to face a pixel at a row 1, column 1 position and a pixel at a row 3, column 1 position, respectively, and wherein yellow filters for transmitting a light ray falling within a yellow wavelength range are arranged to face a pixel at a row 2, column 1 position and a pixel at a row 4, column 1 position, respectively, and wherein transparent members are arranged to face the pixel at the row 1, column 2 position and a pixel at a row 3, column 2 position, respectively, and wherein the first and second polarization filters are arranged to face the pixel at the row 2, column 2 position and the pixel at the row 4, column 2 position, respectively.

9. The 3D image capture device of claim 3, wherein each said pixel block is comprised of eight pixels that are arranged in four rows and two columns, and wherein the first, second and third pixels are arranged at a row 2, column 1 position, a row 1, column 2 position, and a row 4, column 1 position, respectively, and wherein cyan filters for transmitting a light ray falling within a cyan wavelength range are arranged to face a pixel at a row 1, column 1 position and a pixel at a row 3, column 1 position, respectively, and wherein yellow filters for transmitting a light ray falling within a yellow wavelength range are arranged to face a pixel at a row 2, column 2 position and a pixel at a row 4, column 2 position, respectively, and wherein transparent members are arranged to face the pixel at the row 1, column 2 position and a pixel at a row 3, column 2 position, respectively, and wherein the first and second polarization filters are arranged to face the pixel at the row 2, column 1 position and the pixel at the row 4, column 1 position, respectively.

10. The 3D image capture device of claim 3, wherein each said pixel block is comprised of eight pixels that are arranged in four rows and two columns, and wherein the first, second and third pixels are arranged at a row 2, column 2 position, a row 1, column 2 position, and a row 4, column 2 position, respectively, and wherein red filters for transmitting a light ray falling within a red wavelength range are arranged to face a pixel at a row 1, column 1 position and a pixel at a row 3, column 1 position, respectively, and wherein blue filters for transmitting a light ray falling within a blue wavelength range are arranged to face a pixel at a row 2, column 1 position and a pixel at a row 4, column 1 position, respectively, and wherein green filters for transmitting a light ray falling within a green wavelength range are arranged to face the pixel at the row 1, column 2 position and a pixel at a row 3, column 2 position, respectively, and wherein the first polarization filter and another green filter for transmitting a light ray falling within the green wavelength range are arranged to face the pixel at the row 2, column 2 position, and wherein the second polarization filter and still another green filter for transmitting a light ray falling within the green wavelength range are arranged to face the pixel at the row 4, column 2 position.

11. The 3D image capture device of claim 3, wherein each said pixel block is comprised of eight pixels that are arranged in four rows and two columns, and wherein the first, second and third pixels are arranged at a row 2, column 1 position, a row 1, column 2 position, and a row 4, column 1 position, respectively, and wherein red filters for transmitting a light ray falling within a red wavelength range are arranged to face a pixel at a row 1, column 1 position and a pixel at a row 3, column 1 position, respectively, and wherein blue filters for transmitting a light ray falling within a blue wavelength range are arranged to face a pixel at a row 2, column 2 position and a pixel at a row 4, column 2 position, respectively, and wherein green filters for transmitting a light ray falling within a green wavelength range are arranged to face the pixel at the row 1, column 2 position and a pixel at a row 3, column 2 position, respectively, and wherein the first polarization filter and another green filter for transmitting a light ray falling within the green wavelength range are arranged to face the pixel at the row 2, column 1 position, and wherein the second polarization filter and still another green filter for transmitting a light ray falling within the green wavelength range are arranged to face the pixel at the row 4, column 1 position.

12. The 3D image capture device of claim 3, wherein each said pixel block is comprised of eight pixels that are arranged in four rows and two columns, and wherein the first, second and third pixels are arranged at a row 2, column 2 position, a row 1, column 2 position, and a row 4, column 2 position, respectively, and wherein red filters for transmitting a light ray falling within a red wavelength range are arranged to face a pixel at a row 1, column 1 position and a pixel at a row 3, column 1 position, respectively, and wherein blue filters for transmitting a light ray falling within a blue wavelength range are arranged to face a pixel at a row 2, column 1 position and a pixel at a row 4, column 1 position, respectively, and wherein transparent members are arranged to face the pixel at the row 1, column 2 position and a pixel at a row 3, column 2 position, respectively, and wherein the first and second polarization filters are arranged to face the pixel at the row 2, column 2 position and the pixel at the row 4, column 2 position, respectively.

13. The 3D image capture device of claim 3, wherein each said pixel block is comprised of eight pixels that are arranged in four rows and two columns, and wherein the first, second and third pixels are arranged at a row 2, column 1 position, a row 1, column 2 position, and a row 4, column 1 position, respectively, and wherein red filters for transmitting a light ray falling within a red wavelength range are arranged to face a pixel at a row 1, column 1 position and a pixel at a row 3, column 1 position, respectively, and wherein blue filters for transmitting a light ray falling within a blue wavelength range are arranged to face a pixel at a row 2, column 2 position and a pixel at a row 4, column 2 position, respectively, and wherein transparent members are arranged to face the pixel at the row 1, column 2 position and a pixel at a row 3, column 2 position, respectively, and wherein the first and second polarization filters are arranged to face the pixel at the row 2, column 1 position and the pixel at the row 4, column 1 position, respectively.

14. The 3D image capture device of claim 8, wherein the image generating section makes computations on pixels signals supplied from the eight pixels, thereby generating two images associated with the light rays that have entered the first and second polarizing areas, respectively, and a color image.

15. The 3D image capture device of claim 3, wherein each said pixel block further includes a fourth pixel, and wherein the first, second, third and fourth pixels are arranged in two rows and two columns, and wherein a first color filter for transmitting a light ray falling within a first wavelength range is arranged to face the second pixel, and wherein a second color filter for transmitting a light ray falling within a second wavelength range is arranged to face the fourth pixel.

16. The 3D image capture device of claim 15, wherein the first and second wavelength ranges correspond to the red and blue wavelength ranges, respectively.

* * * * *